(12) United States Patent
Pierce et al.

(10) Patent No.: US 6,283,697 B1
(45) Date of Patent: Sep. 4, 2001

(54) MOBILE APPARATUS WITH PLURALITY OF CONVEYORS

(76) Inventors: Kevin J. Pierce, 6473 E. Lake Dr.; Michael J. Pierce, 6373 E. Lake Dr., both of Grand Forks, ND (US) 58201; Karen Dufault, R.R. #1, Box 45b; Wayne A. Pierce, R.R. 1, Box 45c, both of East Grand Forks, MN (US) 56721

( * ) Notice: Subject to any disclaimer, the term of this patent is extended or adjusted under 35 U.S.C. 154(b) by 0 days.

(21) Appl. No.: 09/312,591

(22) Filed: May 14, 1999

Related U.S. Application Data

(60) Provisional application No. 60/091,305, filed on Jun. 30, 1998.

(51) Int. Cl.$^7$ ................................................. B60P 1/36
(52) U.S. Cl. ........................ 414/504; 414/528; 414/523; 239/672; 198/316.1; 198/588
(58) Field of Search .................................... 414/528, 503, 414/504, 505, 502, 523, 489; 239/672, 674, 676; 198/311, 312, 314, 315, 316.1, 606, 588, 313, 586

(56) References Cited

U.S. PATENT DOCUMENTS

| | | | |
|---|---|---|---|
| 2,503,129 | * | 4/1950 | Pautz ..................... 414/503 |
| 3,122,251 | * | 2/1964 | Gardipee ................ 414/489 |
| 3,863,783 | * | 2/1975 | Spellman, Jr. .......... 414/523 |
| 4,874,283 | * | 10/1989 | Hurley, Jr. ............ 414/523 X |
| 5,190,432 | * | 3/1993 | Gerow .................... 414/523 X |
| 5,718,556 | * | 2/1998 | Forsyth ................. 414/523 X |
| 5,893,262 | * | 4/1999 | Harbach ................ 414/523 X |

* cited by examiner

*Primary Examiner*—Frank E. Werner
(74) *Attorney, Agent, or Firm*—Robert E. Kleve

(57) ABSTRACT

The invention is directed to a mobile bin device having a mobile bin with a first conveyor extending along the bottom of the bin beneath a bin opening to convey material in the bin to one end of the bin. A second belt conveyor has one end pivotally mounted to the one end of the bin to pivot relative to the bin upward and downward and to one side or the other. The second conveyor is slidably mounted in its pivotal mounting to side longitudinally in the mounting to along the one end of the bin beneath the one end of the first conveyor to shorten or lengthen the distance from the outer end of the first conveyor to the outlet end of the second conveyor at the one end of the bin. Power devices are provided to power the upward and downward movement of the second conveyor and the longitudinal movement of the second conveyor.

3 Claims, 3 Drawing Sheets

MOBILE APPARATUS WITH PLURALITY OF CONVEYORS

This application claims benefit to U.S. Provisional application Ser. No. 60/091305 filed Jun. 30, 1998.

This invention relates to material handling devices, more particularly, the invention relates to mobile bin apparatus having conveying means for conveying material in the bin to one end of the bin and a second conveying means movably positioned for conveying the material from the end of the bin to a more remote location from the one end of the bin.

It is an object of the invention to provide a novel mobile bin device having a first conveyor means along the bottom of the bin with its conveying outlet at one end of the bin for conveying material in the bin to one end of the bin and a second belt conveying means adjustably mounted at the one end of the bin to receive material conveyed to the one end of the bin and adjustably mounted to pivot an outer end upward and downward about a pivot adjacent said one end of the bin to raise and lower the other end of the second conveyor means with said second conveyor means slidably mounted in said pivotal mounting to the bin to move longitudinally in length along the outlet end of the first conveyor means at the one end of the bin to shorten or lengthen the distance from the outer end of the second conveyor means to the outlet of the first conveyor means at the one end of the bin.

It is another object of the invention to provide a novel mobile bin having a first conveyor for conveying material in the bin to an end of the bin and a second conveyor which has received material from the first conveyor and is adjustable in length to place the material at different lengths from the bin and adjustable in height as well as direction.

It is a further object of the invention to provide a novel mobile bin having a first belt conveyor for conveying material in the bin to one end of the bin and as second belt conveyor for receiving material from the first conveyor with the second conveyor adjustable longitudinally in length and pivotable at one end upward and downward and horizontally relative to the bin with a mechanism for the pivotal and slidable adjustable movement for the second conveyor being adjacent the one end of the bin.

Further objects and advantages of the invention will become apparent as the description proceeds and when taken in conjunction with the accompanying drawings.

BRIEF DESCRIPTION OF PREFERRED EMBODIMENT

Briefly stated, the invention comprises a mobile bin having frame with a bin mounted thereon with wheels for transporting the bin on the ground, a first conveyor is mounted along the bottom of the bin and extends to one end of the bin for conveying material from with the bin to the one end of the bin, a second belt conveyor has a mounting frame which is pivotally mounted at the one end to the one end of the bin to pivot about a vertical axis to pivot the second belt conveyor about a vertical axis beneath the one end of the bin, a channel for slidably receiving the second conveyor is pivotally mounted to the mounting frame to pivot about a horizontal axis and the second conveyor is slidably mounted in the channel, hydraulic power means are provided to slide the second conveyor along the channel to change the position of the second conveyor relative to the first conveyor horizontal beneath the end of the first conveyor, and second hydraulic power means are provided to pivot the channel and second conveyor upward and downward about the horizontal axis and a third hydraulic power means are provided to pivot the mounting frame about its vertical axis.

Figure 1:
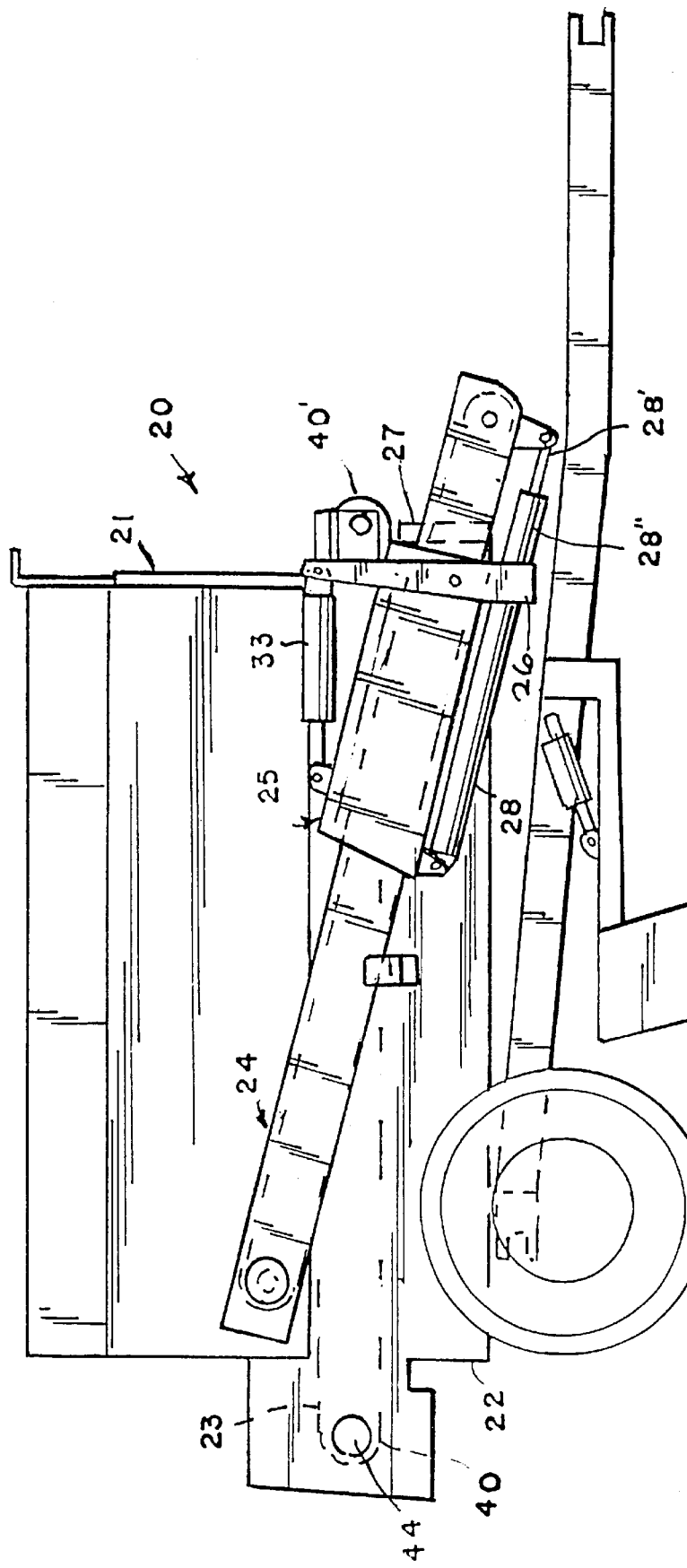
FIG. 1 is a side elevational view of the mobile bin two conveyor invention illustrating a first conveyor along the bottom to convey material from the bin to a second conveyor at an end of the bin, with the second conveyor being adjustable in length with respect to its outlet and the first conveyor outlet.
Figure 5:
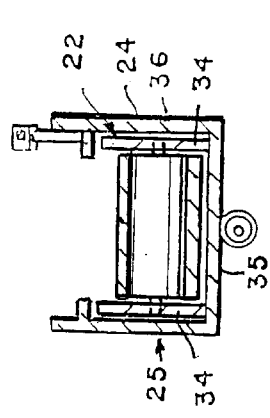
FIG. 5 is an end view taken along line 5—5 of FIG. 2.
Figure 6:
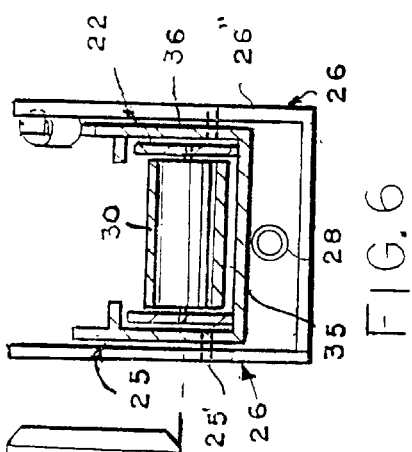
FIG. 6 is a cross sectional view taken along line 6—6 of FIG. 2.
Figure 2:
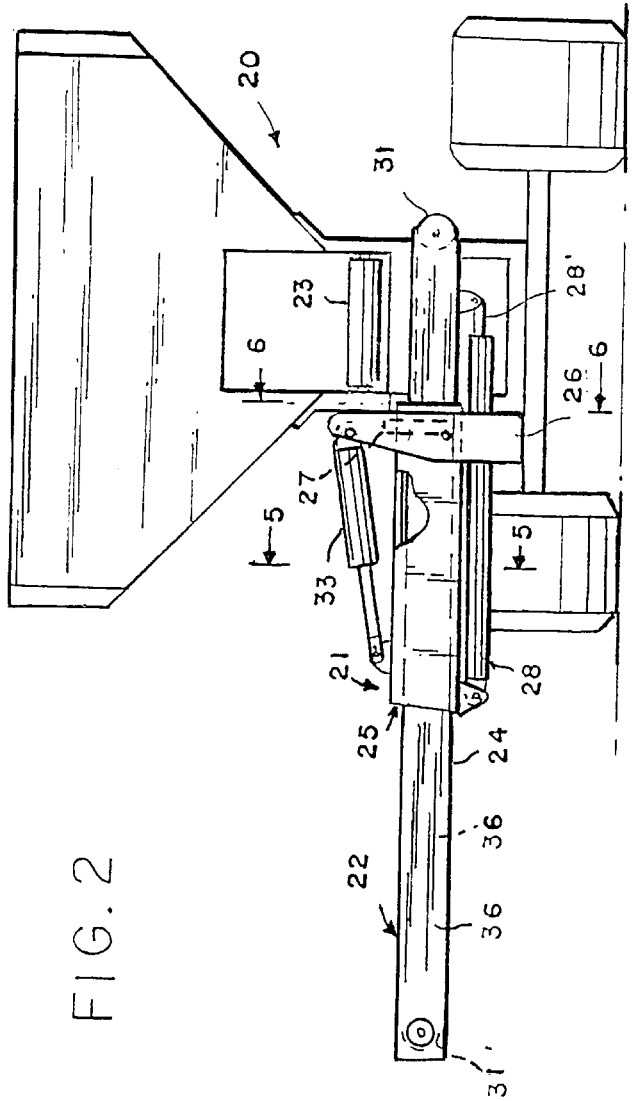
FIG. 2 is a end view of the invention illustrating the length adjustable second conveyor extended in length laterally away from the bin to its fully extended operative position.
Figure 3:
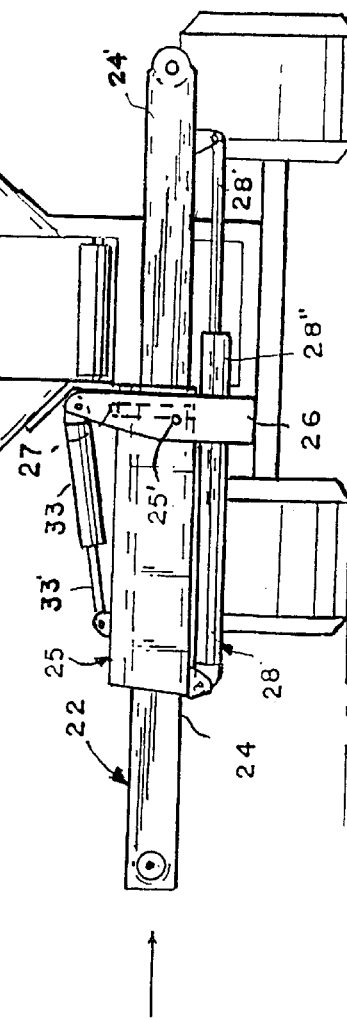
FIG. 3 is an end view illustrating the adjustable in length second conveyor retracted to its closest operating position with respect to the first conveyor.
Figure 4:
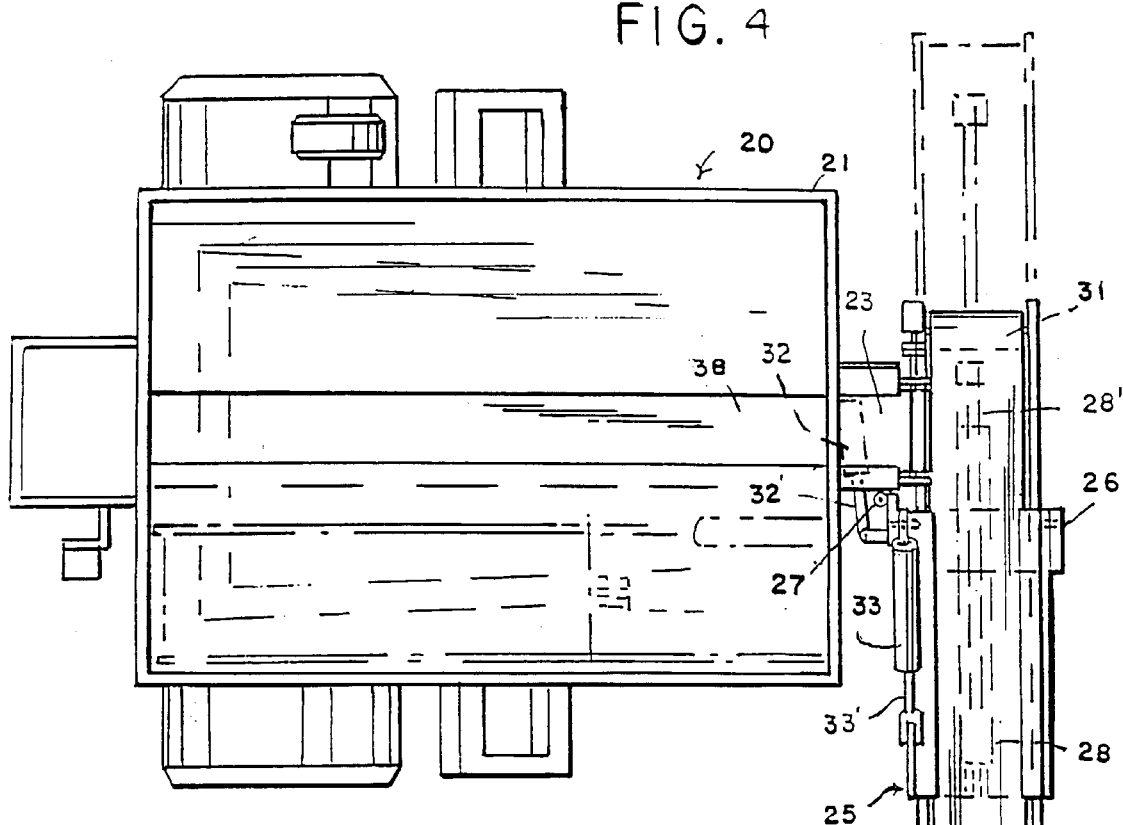
FIG. 4 is a top view of the invention illustrating the length adjustable second conveyor in its fully extended operative position.
Figure 7:
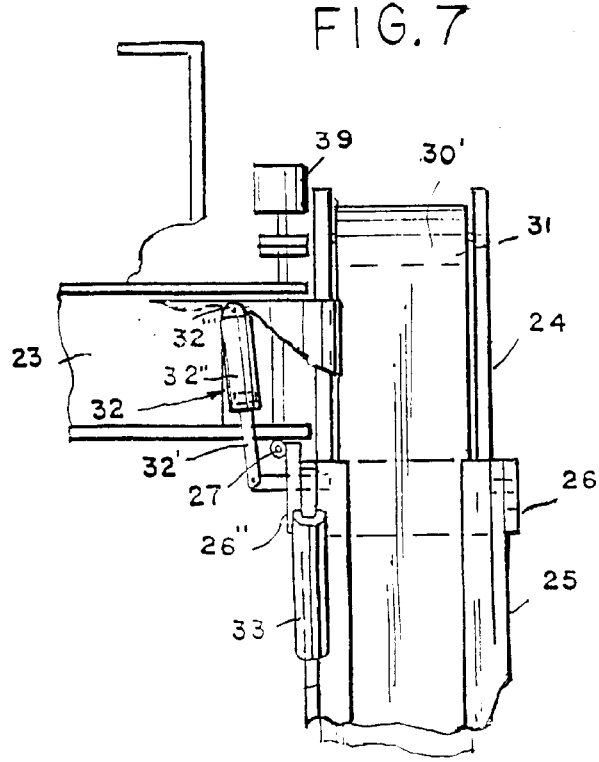
FIG. 7 is a fragmentary enlarged view similar to FIG. 4, with portions cutaway to reveal the hydraulic piston and cylinder construction for pivoting the second conveyor about a vertical axis with respect to the bin of the device.
Figure 8:
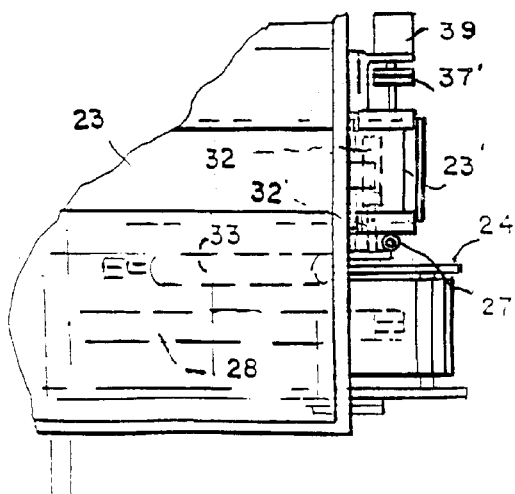
FIG. 8 is a fragmentary top view similar to FIG. 4 illustrating in solid lines the second sliding conveyor pivoted to a parallel storage position beside the bin.

Referring more particularly to the drawings, in FIG. 1,2, and 3 the mobile bin invention 20 is illustrated having a bin 21 mounted on a frame 22 and a first conveyor 23 mounted beneath the bin and with a second conveyor 24 slidably adjustable in length and a conveyor receiving frame 25 which frame slidably receives the second conveyor 24. The sliding conveyor frame 25 is pivotally mounted to the pivot frame 26 by a horizontal pivot pins 25' to pivot about a horizontal axis relative to a pivot frame 26. The pivot frame 26 is pivotally mounted to the bin frame 21 to pivot about a vertical axis relative to the bin, bin frame and the pivot carrier frame 25 by a pivot 27 which is mounted between the frame 21 of the device and the one vertical leg 26" of the U shaped pivot frame 26.

The slidably second conveyor 24 is slidably mounted in the pivotal carrier frame 25 to slide along its length along the pivotal frame. The slidable second conveyor 24 is pivoted by the pivot frame 26 about the pivot 27 to a position beneath outlet end 23' of the first conveyor means. When the slidable conveyor is pivoted beneath the outlet end of the first conveyor, the slidable movement of the conveyor relative to the pivot frame acts to adjust the distance of the outer end 24' of the second conveyor means to the outlet end 23' of the first conveyor means. A first hydraulic piston and cylinder 28 is mounted beneath the carrier or sleeve frame 25 with its cylinder pivotally mounted to the frame 25 and its piston pivotally mounted to the sliding second conveyor 24 whereby telescoping the piston 28' in the cylinder 28" will slide the conveyor 24 along the sliding frame 25. The second conveyor 24 is slidable along the carrier frame 25 to slide the second conveyor along the outlet end 23' of the first conveyor 23 to move the outlet end 24' of the second conveyor toward the outlet end of the first conveyor while the other end of the second conveyor moves away from the outlet end of the first conveyor, and while maintaining the belt 30 along its upper face 30' continuously beneath the outlet end of the first conveyor so that a selected upper portion of the belt will always receive material leaving the outlet end 23' of the first conveyor with the selected receiving portion of the belt depending upon what selected portion is adjustably located beneath the outlet end of the first conveyor when sliding the sliding second conveyor along the sliding frame.

A second piston and cylinder 32 pivotally mounted between the bin frame and the pivot frame 26 with the cylinder 32' pivotally mounted to the frame at 32" and the piston 32" pivotally mounted to the pivot frame 26 at pivot 42 to pivot the pivot frame 26, the sliding frame 25 and the sliding conveyor 24 about the vertical axis of the pivot mounting 27 of the pivot frame 26 to the bin frame 21. A third piston and cylinder 33 acts as a raising and lowering piston and cylinder 33 for the second conveyor, with its piston 33' pivotally mounted to the sliding carrier frame 25 and its cylinder 33" pivotally mounted to the pivotal frame 26 to pivot about pins 25' pivotally mounting the side panels 34 and 34' of the carrier frame 25 to the side panels 26' and 26" of the pivot frame 26.

The carrier frame 25 has a elongated bottom panel 35 and the pair of side panels 34 and 34' formed together to form a U shaped channel. The slidable second conveyor 24 has a pair of elongated side panels 36 and 36' and a pair of rollers or drums 31 and 31' rotatably mounted at each end of the side panels with the endless belt 30 rotatably mounted about the drums so that powering one of the drums, for example rotates the endless belt 30.

The conveyor belt 23 is powered by a reversable motor 38 which drives the drum 40' which rotates the endless belt 38 which in turn rotates the drum 40 rotatably mounted at the other end of the bin. A motor 44 powers and rotates drum 40 powering the belt in the direction of the other end of the bin will convey the material in the bin to another adjustable belt conveyor which may mounted at the other end 41 of the bin. Overload slip clutches 37' are mounted between the motor shaft and drums of the motors powering the belt drum.

Thus, it will be seen that a novel mobile bin has been provided with a conveyor to convey material to one end of the bin a novel second conveyor which is slidably mounted to a channel to slide along its length the channel to change its the portion of the second conveyor positioned beneath the one end of the first conveyor to change the output location of the second conveyor in relation to the first conveyor.

It will be obvious that various changes and departures may be made to the invention. without departing from the spirit and scope thereof and accordingly, it is not intended that the invention be limited to that specifically described in the specification or as illustrated in the drawings but only as set forth in the appended claims wherein;

What is claimed is:

1. In a mobile bin device having a mobile frame with a elongated bin mounted on said frame, said frame having wheels rotatably mounted to said frame to rotatably support said frame, said bin having a remote ends and opposing sides with a bottom with an opening along its bottom; with a first elongated belt conveyor mounted to said frame beneath said bin opening with said first belt conveyor having remote ends, and a second elongated belt conveyor with said second belt conveyor having remote ends;

a conveyor channel apparatus comprising a elongated channel and a pivot frame; said channel being adapted to slidably receive and carry said second belt conveyor and enable said second belt conveyor to slide longitudinally in said channel, said pivot frame being pivotally mounted to said channel about a horizontal axis and pivotally mounted to said bin device adjacent one end of said first belt conveyor about a vertical axis, said pivot frame being pivotal about said vertical axis to pivot said channel and said second belt conveyor from a position parallel to and adjacent to one end of said first conveyor to a position extending laterally outward from said one end of said first conveyor and adjacent to said one end of said first belt conveyor with one end of said second belt conveyor beneath said one end of said first belt conveyor;

power means to power the pivotal movement of said pivot frame about said vertical axis and thereby pivot said channel and second belt conveyor about said vertical axis from said position parallel in length and beside said first belt conveyor to said position extending laterally outward in length from said first belt conveyor with said one end of said second conveyor beneath said one end of said first belt conveyor;

power means to power the sliding movement of said second belt conveyor longitudinally along said channel to enable said second belt conveyor to be extended laterally outward from said one end of said first belt conveyor by said sliding movement a selected distance laterally outward away from said first belt conveyor, while maintaining portions of said second belt conveyor beneath said one end of said first belt conveyor to enable material to be transported from said bin by said first belt conveyor to the second belt conveyor and distributed off the other end of said second belt conveyor a selected distance laterally outward from said first belt conveyor;

power means to power the pivotal movement of said conveyor channel about its horizontal pivotal mounting to the pivot frame to thereby pivot the other of said ends of said second belt conveyor upward or downward about the horizontal axis of said channel mounting to the pivot frame.

2. A mobile bin device according to claim 1, wherein said power means to power the sliding movement of said second belt conveyor along said channel comprises a hydraulic piston and cylinder mounted between said channel and said second conveyor; and wherein said power means to power movement of said channel about said horizontal axis on said pivot frame includes a second hydraulic piston and cylinder connected between said channel and pivot frame to power said pivotal movement of said conveyor frame about said horizontal axis.

3. In mobile bin apparatus having a mainframe, a elongated bin mounted on said frame, wheels rotatably mounted to said frame for rotatably supporting said frame, with said bin having remote ends and sides and a bottom with an opening in the bottom, a elongated first belt conveyor mounted adjacent said frame beneath said opening in said bin with said first belt conveyor having remote ends with elongated opposing sides; and a second elongated belts conveyor with remote ends;

a conveyor carrier apparatus comprising and elongated conveyor carrying frame, a pivot frame pivotally mounted to said carrier frame about a horizontal axis and pivotally to said bin apparatus adjacent one end of the first conveyor to pivot about a vertical axis, said carrying frame being adapted for slidably receiving and carrying longitudinally said second conveyor to enable said second conveyor to slide longitudinally along the carrier frame, said conveyor carrying frame being pivotal on said pivotal frame about said vertical axis to pivot said second conveyor from a position adjacent one end of said first conveyor and parallel and beside said first conveyor on said vertical axis of said pivot frame to a position extending laterally outward from said first conveyor and bin and adjacent said one end of said first belt conveyor with one of said ends of said second belt conveyor below and beneath said one end of said first belt conveyor, a hydraulic piston and cylinder mounted along a length of said second carrier frame and mounted between said second conveyor and carrier frame to power the slidable movement of said second belt conveyor along said carrier frame when said second conveyor is positioned laterally outward from said bin to extend the other end of said second conveyor to selected distances outward laterally away from said first conveyor while maintaining at least a portion of said second conveyor beneath said one end of said first belt conveyor.

* * * * *